(12) United States Patent
Routeau et al.

(10) Patent No.: US 12,326,202 B2
(45) Date of Patent: Jun. 10, 2025

(54) END CONNECTION ASSEMBLY AND METHOD FOR PRODUCING THE SAME

(71) Applicant: FMC Kongsberg Subsea AS, Kongsberg (NO)

(72) Inventors: Sylvain Routeau, Saint Cloud (FR); Philippe Espinasse, Bihorel (FR); Stein Rune Rasmussen, Kongsberg (NO); Juliette Stephant, Suresnes (FR)

(*) Notice: Subject to any disclaimer, the term of this patent is extended or adjusted under 35 U.S.C. 154(b) by 74 days.

(21) Appl. No.: 16/959,996

(22) PCT Filed: Jan. 2, 2019

(86) PCT No.: PCT/EP2019/050039
§ 371 (c)(1),
(2) Date: Jul. 2, 2020

(87) PCT Pub. No.: WO2019/134917
PCT Pub. Date: Jul. 11, 2019

(65) Prior Publication Data
US 2021/0062937 A1 Mar. 4, 2021

(30) Foreign Application Priority Data
Jan. 4, 2018 (NO) .................................. 20180012

(51) Int. Cl.
*F16L 1/26* (2006.01)
*F16L 33/01* (2006.01)
*E21B 43/013* (2006.01)

(52) U.S. Cl.
CPC ................. *F16L 1/26* (2013.01); *F16L 33/01* (2013.01); *E21B 43/0135* (2013.01)

(58) Field of Classification Search
CPC .................................... F16L 1/26; F16L 33/01
See application file for complete search history.

(56) References Cited

U.S. PATENT DOCUMENTS

| 5,421,674 A | 6/1995 | Maloberti et al. |
| 5,911,448 A * | 6/1999 | Feher ..................... B25B 27/10 285/259 |
| 6,059,336 A * | 5/2000 | Meronek ................. E21B 41/10 279/57 |

(Continued)

FOREIGN PATENT DOCUMENTS

| EP | 1 119 684 B1 | 5/2003 |
| EP | 1 867 906 A1 | 12/2007 |

*Primary Examiner* — Sean D Andrish

(57) ABSTRACT

An end connection assembly (200) for pull-in and coupling of a flexible tubular pipe to an inboard hub of a subsea structure using a tie-in tool, which flexible tubular pipe comprises a plurality of superposed flexible layers (210, 214, 218) of metal materials and plastics materials, wherein the end connection assembly comprises an end fitting (202) which is connected to an end section (204) of the flexible tubular pipe in a sealed manner forming a termination of the flexible tubular pipe in which at least one layer of said plurality of flexible layers is anchored; an engagement surface (226a, 226b) for interacting with engagement means of the tie-in tool; and a collet connector assembly allowing releasable coupling of the end connection assembly to the inboard hub. The engagement surface is arranged in the end fitting radially outside of and circumferentially enclosing the at least one flexible layer.

8 Claims, 5 Drawing Sheets

(56) References Cited

U.S. PATENT DOCUMENTS

| | | | |
|---|---|---|---|
| 6,234,717 B1 | 5/2001 | Corbetta | |
| 8,875,364 B2 * | 11/2014 | Bekkevold | F16L 1/26 29/237 |
| 2011/0005764 A1 * | 1/2011 | Bekkevold | E21B 43/013 166/344 |
| 2016/0319972 A1 | 11/2016 | Dehais et al. | |

* cited by examiner

END CONNECTION ASSEMBLY AND METHOD FOR PRODUCING THE SAME

FIELD OF THE INVENTION

The present invention relates to an end connection assembly for pull-in and coupling of a flexible tubular pipe to an inboard hub of a subsea structure using a tie-in tool, which flexible tubular pipe comprises a plurality of superposed flexible layers of metal materials and plastics materials.

In particular, the present invention relates to an end connection assembly for pull-in and coupling of a flexible tubular pipe forming an internal flow space for hydrocarbon fluid, which end connection assembly provides for pull-in and coupling of the flexible tubular pipe to a subsea hydrocarbon production, processing and/or storage structure.

The present invention also relates to a method of producing an end connection assembly for pull-in and coupling of a flexible tubular pipe to an inboard hub of a subsea structure using a tie-in tool, wherein the flexible tubular pipe comprises a plurality of superposed flexible layers of metal materials and plastics materials.

BACKGROUND

Flexible tubular pipes are used for transportation of hydrocarbon or petroleum products, such as oil and gas, between subsea structures, e.g. hydrocarbon production, processing and/or storage structures, typically standing on the seabed floor. Pipeline End Manifolds (PLEMs), Pipeline End Terminations (PLETs) and Christmas trees located on the seabed floor are examples of such subsea structures.

Flexible tubular pipes, described in the normative documents API 17J, "Specification for Unbonded Flexible Pipe" and API RP 17B, "Recommended Practice for Flexible Pipe" published by the American Petroleum Institute, comprise a plurality of superposed layers of metal materials and plastics materials, giving them their mechanical properties and their sealing properties with respect to the hydrocarbon that they transport and to the surrounding environment.

In addition, they generally comprise, from the inside to the outside, a metal carcass made of an interlocked spiral metal strip, a pressure sheath made of polymer material, a helical winding at a short pitch of a metal wire forming a pressure vault, at least one metal tensile armour ply wound at a long pitch around said pressure vault, and an external protective sheath made of polymer material. These pipes can also have, in some cases, an intermediate sheath made of polymer material.

In order to allow exchange of hydrocarbon fluid between such a flexible tubular pipe and a hydrocarbon production or processing installation, the pipe is provided with an end fitting, also sometimes referred to as a termination head, which is connected, in a sealed manner, to the pressure sheath inside which the hydrocarbon flows. Consequently, the end fitting forms a permanent termination of the flexible pipe providing anchorage for the different layers of the pipe. When the pipe has an intermediate sheath, the latter normally also has to be connected to the end fitting in a sealed manner. The sealing of the external sheath is less important than that of the pressure sheath and of the intermediate sheath, since most flexible pipes are designed to durably withstand a loss of sealing of the external sheath. However, it is preferable for the external sheath to also be sealed and connected to the end fitting in a sealed manner, notably when the pipe is intended for an underwater application, so as to avoid seawater passing through the wall of the pipe and corroding the metal armour.

A method for mounting an end fitting to a flexible tubular pipe allowing the pipe to be connected to other pipes or structures is disclosed in US 2016/0319972 A1, which is hereby incorporated by reference in its entirety.

Systems and methods for pull-in and coupling of a hydrocarbon flowline or pipeline to a subsea structure are known within the art. One such system is marketed by TechnipFMC under the trademark of ROVCON and comprises a tie-in tool operated by a Remotely Operated Vehicle (ROV). In operation, the ROV carrying the tie-in tool attaches pull-in wires of the tie-in tool to an inboard hub of the subsea structure to which the flowline is to be connected. The ROV then "flies" to the flowline to be connected while the ropes are payed out. The ROV lands on and locks onto the end fitting of the flowline and, using the wires, winches in and aligns the end fitting with the inboard hub. Stroking cylinders of the tie-in tool performs the final pull-in and closing of the connection. For the connection, a collet connector, typically a KC collet connector, may be attached to the end fitting. However, it is also possible to use other connectors, e.g. clamps.

A KC collet connector comprises fingers which are arranged to grip and lock on to a flanged section of the inboard hub. After connection is achieved, an external pressure test may be performed to verify the integrity of the seal and the tie-in tool is unlocked from termination head, allowing the ROV and tie-in tool to continue with another tie-in or to be retrieved to the surface. This system is designed for used in tie-in operations of rigid pipeline. Consequently, the tool is adapted to be attached to a rigid pipeline.

Another tie-in system is marketed by TechnipFMC under the trademark of UCON-H. This system is also designed for tie-in of a rigid pipeline.

A method and an apparatus which is capable of performing diverless connection of underwater flow lines and connection of these flow lines to underwater structures are disclosed in U.S. Pat. No. 6,234,717 B1.

In order to allow a tie-in tool to be used for connecting a flexible tubular pipe equipped with an end fitting to a subsea structure, a rigid adapter piece comprising engagement surfaces for interacting with engagement means of the tie-in tool, e.g. pull-in clamps, may be included in the assembly between the end fitting of the flexible pipe and the connector, e.g. a collet connector.

However, pull-in and coupling of a flexible tubular pipe using an adaptor piece connected to the end fitting has proven to be problematic. In particular, a problem that arises when using an adaptor piece, is that the resulting end connection assembly becomes long. Consequently, when the adaptor piece is connected to the end fitting of the flexible pipe, the resulting assembly will be difficult to handle physically, especially when reeled up on a reel onboard a vessel when the assembly is to be launched at sea.

Also, an adapter piece will cause bending stresses that need to be taken into account when designing the subsea structure to which the flexible pipe is to be connected, which bending stresses may necessitate adaptation of the subsea structure in order to allow the subsea structure to handle the added stresses.

Furthermore, an adaptor piece adds cost to the tie-in system.

Therefore, one object of the present invention is to solve or at least alleviate these problems and provide an end connection assembly which is easy to handle and/or enables pull-in and coupling of a flexible tubular pipe to a subsea structure without causing excessive bending stresses.

Another object of the invention is to provide a method for producing such an end connection assembly.

SUMMARY OF THE INVENTION

According to one aspect of the invention, the end connection assembly comprises:
- an end fitting which is connected to an end section of the flexible tubular pipe in a sealed manner, said end fitting forming a termination of the flexible tubular pipe in which at least one layer of said plurality of flexible layers is anchored;
- at least one engagement surface for interacting with engagement means of the tie-in tool; and
- a collect connector assembly allowing releasable coupling of the end connection assembly to the inboard hub, wherein the engagement surface is arranged in the end fitting radially outside of and circumferentially enclosing the at least one flexible layer.

According to another aspect of the invention, the method of producing the end connection assembly comprises the steps of:
- connecting an end fitting to an end section of the flexible tubular pipe in a sealed manner forming a termination of the flexible tubular pipe in which at least one layer of said plurality of flexible layers is anchored;
- at a location radially outside of at least one of the plurality of superposed flexible layers, providing the end fitting with an engagement surface for interacting with engagement means of the tie-in tool, which engagement surface circumferentially encloses the at least one flexible layer; and
- mounting, to the end fitting, a collect connector assembly allowing releasable coupling of the end connection assembly to the inboard hub.

The end fitting forms a permanent termination of the flexible pipe in which a terminal end section of the at least one flexible layer is anchored, and the at least one flexible layer extends axially into the end fitting at least to a position which is radially inside of and circumferentially enclosed by the engagement surface. The terminal end of the at least one layer is anchored to the end fitting either at or beyond the at least one engagement surface, i.e. between the engagement surface and the collet collector assembly.

By incorporating the engagement surface as an integral part of the end fitting and allowing at least one of the layers of the flexible tubular pipe to extend axially to or beyond the engagement surface, a compact design can be achieved which provides for easy handling, is less prone to cause detrimental bending stresses in the subsea structure to which the end connection assembly is connected, and which also is less expensive to produce than prior art end connection assembly designs.

It may be advantageous if the engagement surface is circular-cylindrical as this will allow the engagement means of the tie-in tool access to the engagement surfaces independent of the circumferential orientation of the tie-in tool vis-à-vis the end fitting.

The end fitting may display a plurality of such engagement surfaces arranged one after the other along the axial length of the end fitting.

The end fitting may comprise an annular recess allowing safe mounting of the collet connector assembly to the end fitting. The end fitting may form the internal body of the collet connector. The end fitting may be formed with an outer surface at the free end of the end fitting adapted to accommodate the fingers of the collet connector. The end fitting thereby forms an integral part of the collet connector. As the end fitting may form the internal body of the collet connector, the collet connector with the multiple fingers will be assembled onto the end fitting as it is attached to the multiple layers of the flexible pipe.

The end fitting may comprise:
- a first section, which is connected to an outer layer of the superposed flexible layers of the flexible tubular pipe in a sealed manner; and
- a second section, which is connected to an inner layer of said plurality of superposed flexible layers in a sealed manner, wherein said engagement surface is arranged radially outside of and circumferentially encloses the inner layer.

The first section may be connected to the second section in a sealed manner enclosing at least one intermediate layer of said plurality of superposed flexible layers in an annular volume between the first section and the second section, wherein said engagement surface may be arranged radially outside of and circumferentially enclose the at least one intermediate layer.

In production of the end connection assembly, the annular volume may be filled with a resin which fixes the enclosed at least one intermediate layer in its intended position.

The at least one intermediate layer may comprise armour formed by a pair of crossed armour plies wound in opposite directions.

The step of connecting the end fitting to the end section of the flexible tubular pipe may comprise the steps of:
- connecting a first section of said end fitting to an outer layer of said plurality of superposed flexible layers in a sealed manner;
- connecting a second section of said end fitting to an inner layer of said plurality of superposed flexible layers in a sealed manner; and
- connecting the first section to the second section in a sealed manner enclosing at least one intermediate layer of said plurality of superposed flexible layers in an annular volume between the first section and the second section.

The step of providing the end fitting with the engagement surface may comprise providing the first section with the engagement surface.

The step of mounting the collect connector assembly on the end fitting may comprise mounting the collect connector assembly on the second section.

The second section of the end fitting may be produced from a first sub-section and a second sub-section, and the method of producing the end connection assembly may comprise the steps of:
- connecting the first sub-section to the at least one inner layer;
- forming a first sub-assembly by connecting the first section to the first sub-section in a sealed manner enclosing the at least one intermediate layer in an annular volume between the first section and the first sub-section;
- testing the integrity of the seal between the first section and the first sub-section;
- forming a second sub-assembly by mounting the collect connector assembly on the second sub-section;
- testing the integrity of the seal between the collect connector assembly and the second sub-section; and after said steps of testing the integrity of the seals, attaching the second sub-assembly to the first sub-assembly by attaching the second sub-section to the first sub-section.

This allows the end section of the pipe, the first section and the first sub-section, on the one hand, and the second sub-section and the collet connector assembly, on the other hand, to be assembled and tested independently of each other, which may be beneficial for logistical reasons.

The step of attaching the second sub-assembly to the first sub-assembly may comprise joining the second sub-section and the first sub-section by welding.

Above-discussed preferred and/or optional features of each aspect of the invention may be used, alone or in appropriate combination, in the other aspects of the invention.

DESCRIPTION OF THE DRAWINGS

Following drawings are appended to facilitate the understanding of the invention.

In the drawings, like reference numerals have been used to indicate common parts, elements or features unless otherwise explicitly stated or implicitly understood by the context.

DETAILED DESCRIPTION OF THE INVENTION

In the following, one or more specific embodiments of the invention will be described in more detail with reference to the drawings. However, it is specifically intended that the invention is not limited to the embodiments and illustrations contained herein but includes modified forms of the embodiments including portions of the embodiments and combinations of elements of different embodiments as come within the scope of the following claims. It should be appreciated that in the development of any such actual implementation, as in any engineering or design project, numerous implementation—specific decisions must be made to achieve the developer's specific goals, such as compliance with system and/or business-related constraints, which may vary from one implementation of the invention to another. Moreover, it should be appreciated that such a development effort might be complex and time consuming, but would nevertheless be a routine undertaking of design, fabrication and manufacture for the skilled person having the benefit of this disclosure.

Figure 1:
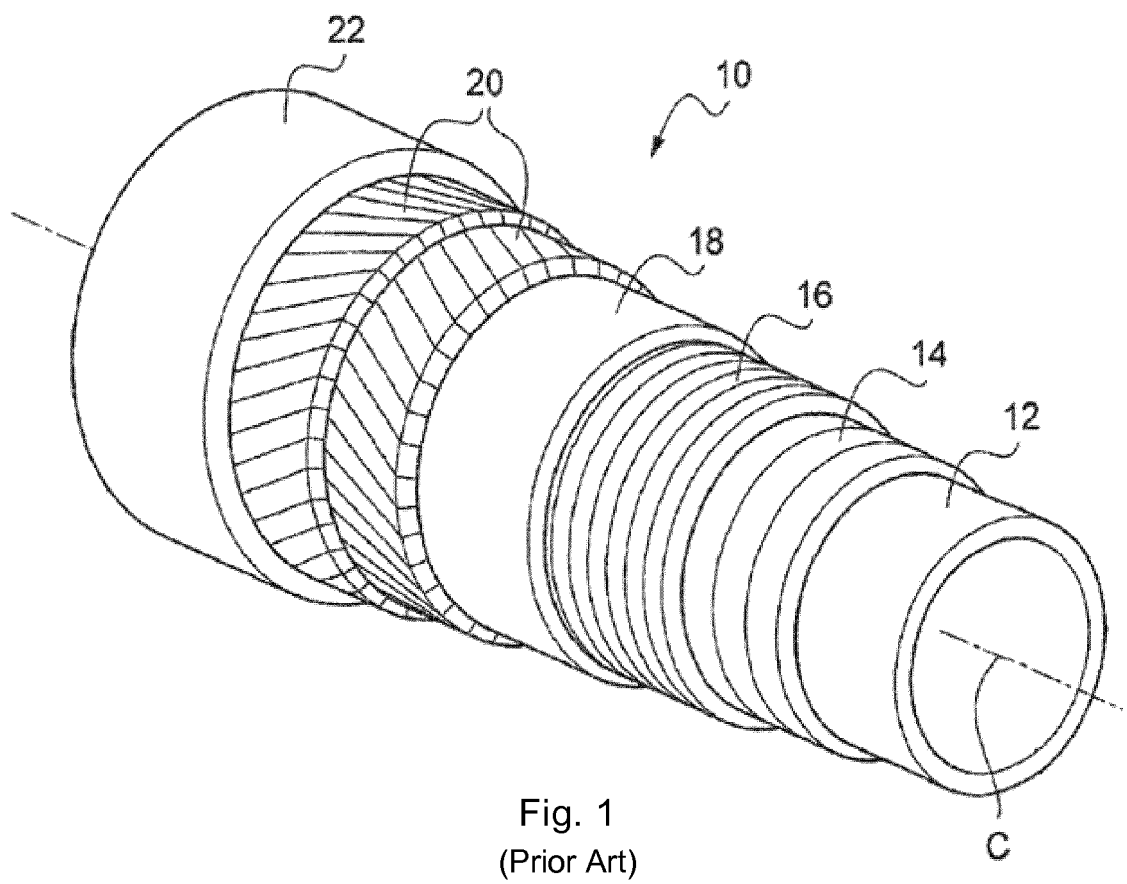
FIG. 1 is a partial schematic cutaway view of a prior art flexible tubular pipe.

FIG. 1 illustrates, in a cutaway view, an example of a flexible tubular pipe 10 for which the end connection assembly according to the invention is suitable to be adopted. The pipe 10 has a pipe axis C and comprises a plurality of superposed flexible layers provided radially one on top of the another, from the inside of the pipe to the outside. The inside of the pipe 10 forms an internal flow space for hydrocarbon fluid.

In the shown embodiment, the flexible tubular pipe 10 comprises, from the inside to the outside, an internal sealing sheath made of polymer material 12, a metal vault 14 formed by the helical winding at a short pitch of at least one metal wire in the form for example of a self-interlocked zeta wire, if necessary a hoop reinforcement 16 formed by a winding at short pitch of a rectangular wire, an anti-collapse intermediate wire sheath 18, armour 20 resistant to axial tension in the longitudinal direction of the pipe and formed by a pair of crossed armour plies wound at a long pitch in opposite directions, and an external sealing sheath made of polymer material 22. The internal sealing sheath 12 is also referred to as pressure sheath. The external sealing sheath 22 is also referred to as external sheath. The metal vault 14 and the hoop reinforcement 16 form the pressure vault 14, 16 of the pipe 10. The main function of the pressure vault 14, 16 is to react the forces associated with the pressure of the fluid flowing through the pipe 10.

The pipe 10 shown in FIG. 1 is referred to as a smooth bore pipe since its first layer starting from the inside is a polymeric tube having a smooth internal surface. This type of pipe has an anti-collapse intermediate wire sheath 18 so as to protect the internal sheath 12 in the event of a loss of sealing of the external sheath 22. Specifically, when the pipe 10 is submerged, an accidental loss of sealing of the external sheath 22 causes flooding of the inside of the wall of the pipe. In this case, the seawater is stopped by the sealed intermediate wire sheath 18, the latter being able to react the hydrostatic pressure since it is supported by the pressure vault 14, 16. In this way, the hydrostatic pressure is not applied to the external face of the pressure sheath 12 and does not cause this sheath to collapse.

The end connection assembly according to the invention could also be applied to pipes referred to as rough bore pipes. These pipes have a metal carcass situated inside the pressure sheath 12. This carcass generally consists of a profiled and interlocked spiral metal strip, its main function being to react the forces associated with the hydrostatic pressure.

Figure 2:
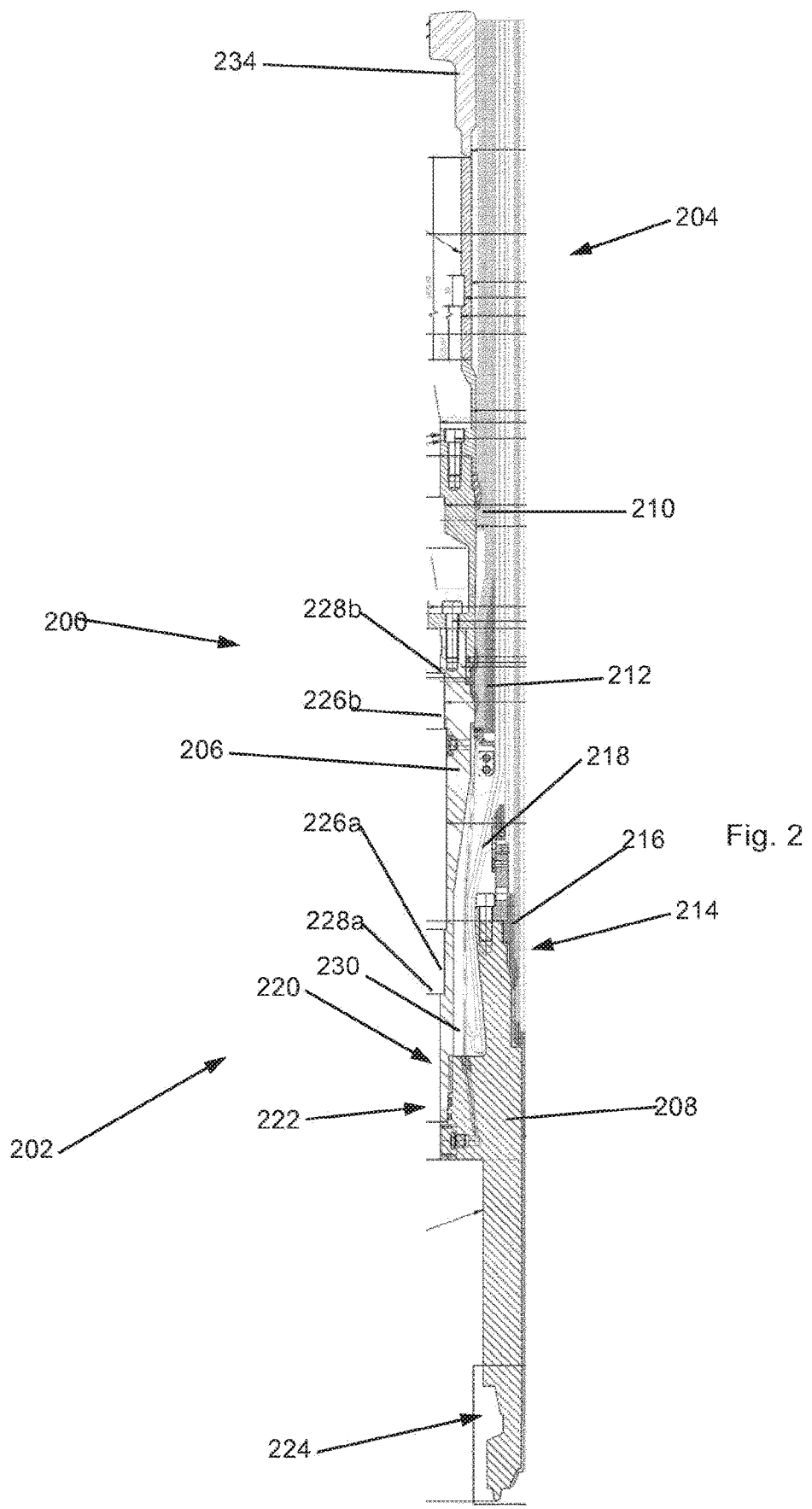
FIG. 2 is a semi-axial view of a first embodiment of an end connection assembly according to the invention.

Reference is now made to FIG. 2, which illustrates, in a semi-axial view, an embodiment of an end connection assembly 200 according to the invention connected to a flexible tubular pipe comprising a plurality of flexible layers.

The end connection assembly 200 comprises an end fitting 202 which is connected to an end section 204 of the flexible tubular pipe 10 in a sealed manner. The end fitting 202 forms a termination of the flexible tubular pipe 10 in which the layers of the flexible pipe are anchored.

The end fitting 202 comprises tubular first and second sections 206, 208.

The first section 206 of the end fitting 202 is connected to an outer layer 210 of the pipe 10 in a sealed manner. The outer layer 210 may for example be an external sealing sheath 22 of the type previously discussed in relation to FIG. 1 and may be connected to the first section 206 by means of a first ring, or cannula, 212, crimping the outer layer 210 against an interior surface of the first section 206.

The second section 208 of the end fitting 202 is connected to an inner layer 214 of the pipe 10 in a sealed manner. The inner layer 214 may for example comprise an internal pressure sheath 12, a metal vault 14, a hoop reinforcement 16 and/or an intermediate wire sheath 18 of the type previously discussed in relation to FIG. 1, and the inner layer 214 may be connected to the second section 208 by means of a second ring, or cannula, 216, crimping the inner layer 214 against an interior surface of the second section 208.

The first section 206 is connected to the second section 208 in a sealed manner covering at least one intermediate layer 218 of the pipe 10, which at least one intermediate layer 218, in the axial direction of the end fitting 202, extends in between the first and second sections 206, 208. In other words, the terminal end section of the at least one intermediate layer 218 is arranged radially outside of the second section 208 but radially inside of the first section 206. The at least one intermediate layer 218 may for example comprise an armoured layer 20 of the type previously discussed in relation to FIG. 1.

The first section 206 is connected to the second section 208 in a sealed manner by means of a threaded joint 220 and a pair of annular sealing rings 222.

Figure 5A:
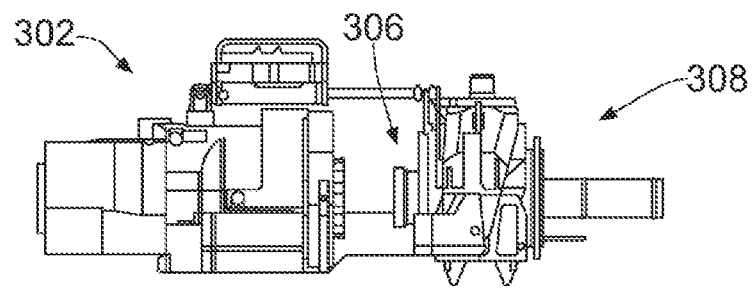
FIGS. 5*a*-5*d* illustrates a procedure of connecting a flexible tubular pipe to an inboard hub of a subsea structure using an end connection assembly according to the invention and a second type of tie-in tool.
Figure 5B:
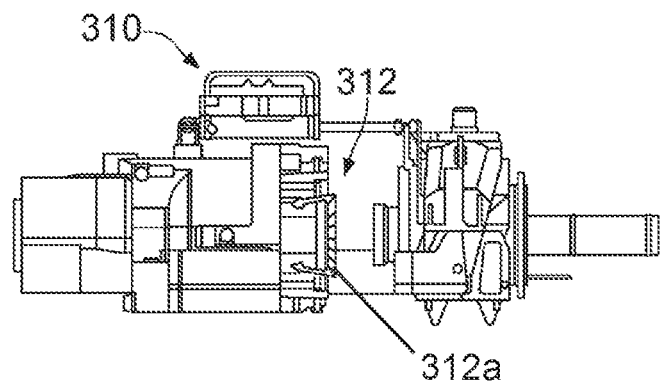
Figure 5C:
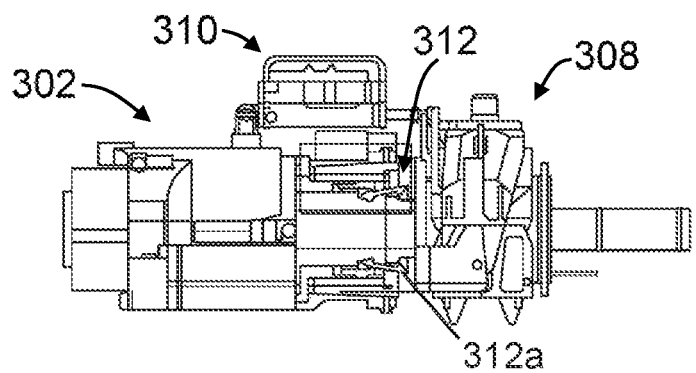

At its free end, the second section 208 of the end fitting 202 comprises an annular recess 224 which allows a collet connector assembly 312 (not shown in FIG. 2, but see FIGS. 5b-5d) to be mounted to the second section 208. As is known in the art of hydrocarbon production, processing and storage, the collet connector assembly 312 is used to provide a tight connection between two fluid carrying elements and comprises collet fingers 312a (see FIGS. 5b-5d) arranged to grip a radially protruding flange or hub of an opposing fluid carrying element. The collet connector may be a KC-connector, e.g. a KC-4 connector, which is well known in the art.

At its outer surface, the first section 206 of the end fitting 202 comprises first and second engagement surfaces 226a, 226b which are arranged for interacting with engagement means, e.g. pull-in clamps, of a tie-in tool. Each engagement surface 226a, 226b is circular-cylindrical, allowing the engagement means access to the engagement surfaces 226a, 226b independent of the circumferential orientation of the tie-in tool vis-à-vis the end fitting 202. The engagement surfaces 226a, 226b are bounded by a radially extending annular surface 228a, 228b that prevent the engagement means from slipping or gliding in the axial direction of the end fitting 202 when the engagement means are in engagement with the engagement surfaces 226a, 226b.

In order to reduce mechanical stress on the end connection assembly 200, bending restrictors 234 may be attached to the end fitting.

When producing the end connection assembly 200, the end fitting 202 is connected to the end section 204 of the flexible tubular pipe in a sealed manner by attaching the inner layer 214 of the pipe to the interior of the second section 208 and arranging the at least one intermediate layer 218 such that it circumferentially encloses the axial end of the second section 208 facing the pipe end section 204. Thereafter, the first section 206 is connected to the second section, enclosing the at least one intermediate layer 218, and the annular volume 230 between the first and second sections 206, 208 in which the at least one intermediate layer 218 is housed is filled with a resin which, when cured, fixes the intermediate layer or layers 218 in their intended positions. The collet connector assembly (not shown in FIG. 2, but see FIGS. 5b-5d) is then attached to the second section 208, after which the integrity of the seal between the end fitting 202 and the end section 204 of the pipe, and also between the end fitting 202 and the collet connector, is tested.

Figure 3:
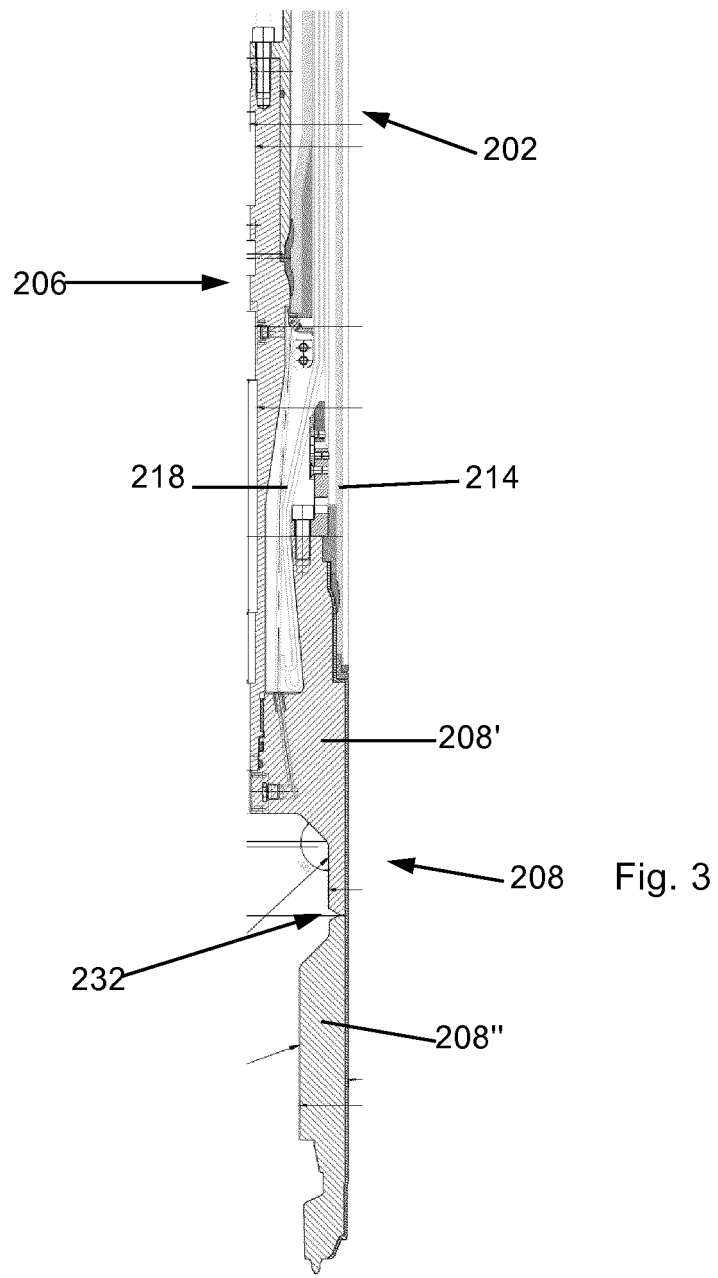
FIG. 3 is a semi-axial view of a second embodiment of an end connection assembly according to the invention.

According to an alternative embodiment of the end connection assembly 200 (see FIG. 3), the second section 208 of the end fitting 202 is produced from a first sub-section 208', which is connected to the inner and intermediate layers 214, 218 and the first section 206 as is discussed above, and a second sub-section 208", to which the collet connector assembly is attached. This allows the end section 204 of the pipe, the first section 206 and the sub-section 208', on the one hand, and the sub-section 208" and the collet connector assembly, on the other hand, to be assembled and tested independently of each other, which may be beneficial for logistical reasons. When the integrity of the seals of the two sub-assemblies thus formed have been tested, sub-section 208" can be attached, e.g. welded, to sub-section 208' to form the final end connection assembly. In FIG. 3 such an alternative embodiment is disclosed, showing a weld joint 232 at the interface between sub-sections 208' and 208".

The procedure of connecting a flexible tubular pipe equipped with one of the above-described end connection assemblies to a subsea structure using a tie-in tool may vary depending on which tie-in tool is used.

Figure 4:
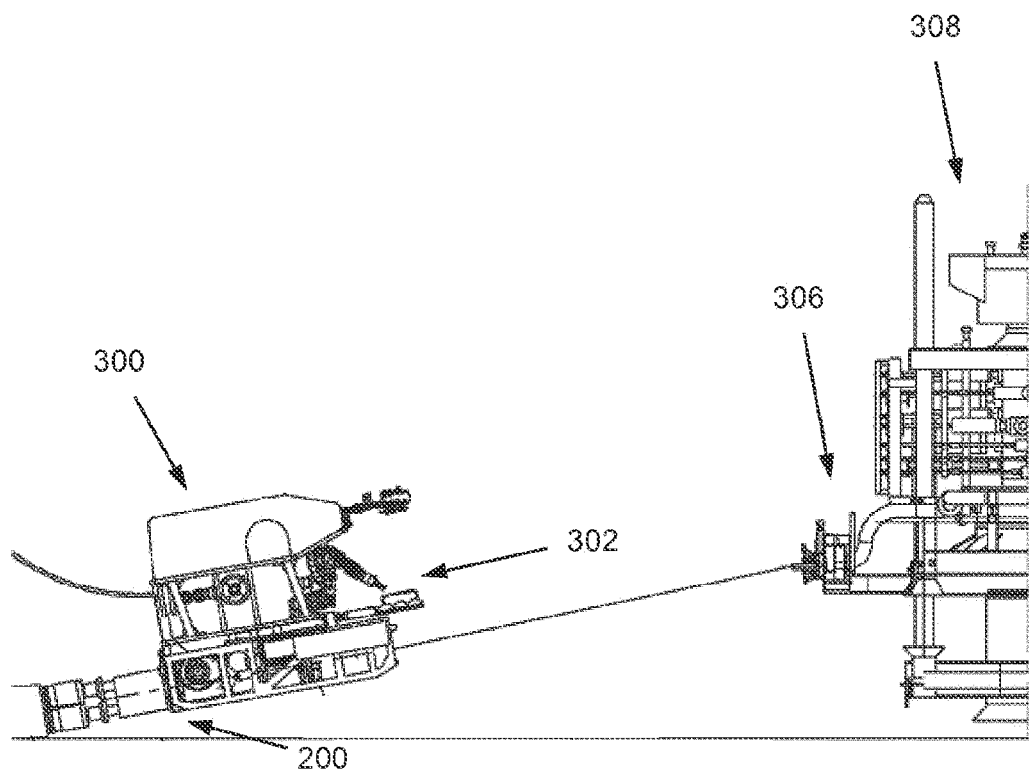
FIG. 4 illustrates a procedure of connecting a flexible tubular pipe to an inboard hub of a subsea structure using an end connection assembly according to the invention and a first type of tie-in tool.

With reference to FIG. 4, the procedure using the tie-in tool marketed as ROVCON generally comprises the steps of:
  using a Remotely Operated Vehicle (ROV) 300, docking the tie-in tool 302 to the end connection assembly 200 by bringing engagement means (not visible in FIG. 4) of the tie-in tool 302 into engagement with the engagement surfaces 226a, 226b;
  using the ROV 300 to operate the tie-in tool 302, bringing the end connection assembly 200 into alignment with an inboard hub 306 of the subsea structure 308, pulling in the end connection assembly 200 to the inboard hub 306, and bringing the collet connector of the end connection assembly 200 into locking engagement with the inboard hub 306; and
  releasing the tie-in tool 302 from the end connection assembly 200 by bringing the engagement means to release the grip of the engagement surfaces 226a, 226b.

Figure 5D:
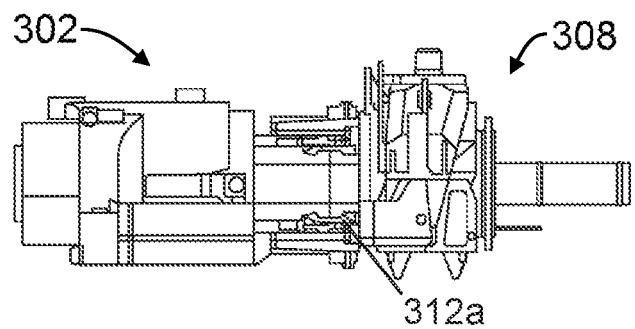

With reference to FIGS. 5a-5d, the procedure using the tie-in tool marketed as UCON generally comprises the steps of:
  connecting the tie-in tool 302 to the end connection assembly 200 by bringing engagement means (not visible in FIGS. 5a-5d) of the tie-in tool 302 into engagement with the engagement surfaces 226a, 226b of the end connection assembly 200;
  bringing the tie-in tool 302 with attached end connection assembly into alignment with an inboard hub 306 of the subsea structure 308 (see FIG. 5a),
  using a stroking tool 310, pulling in the end connection assembly 200 towards the inboard hub 306 (see FIG. 5b, where the collet connector assembly 312 of the end connection assembly and the inboard hub 306 are shown in sectional views),
  bringing the collet connector 312 into locking engagement with the inboard hub 306 (see FIG. 5c); and
  releasing the stroking tool 310 from the tie-in tool 302 (see FIG. 5d).

In the preceding description, various aspects of the apparatus according to the invention have been described with reference to the illustrative embodiment. For purposes of explanation, specific numbers, systems and configurations were set forth in order to provide a thorough understanding of the apparatus and its workings. However, this description is not intended to be construed in a limiting sense. Various modifications and variations of the illustrative embodiment, as well as other embodiments of the apparatus, which are apparent to person skilled in the art to which the disclosed subject-matter pertains, are deemed to lie within the scope of the present invention as defined by the following claims.

The invention claimed is:

1. An end connection assembly for pull-in and coupling of a flexible tubular pipe to an inboard hub of a subsea structure using a tie-in tool, the flexible tubular pipe comprising a plurality of superposed flexible layers, the end connection assembly comprising:
- an end fitting which is connected to an end section of the flexible tubular pipe in a sealed manner to form a termination of the flexible tubular pipe in which at least one layer of said plurality of flexible layers is anchored;
- an engagement surface on the end fitting for interacting with pull-in engagement means of the tie-in tool, wherein the engagement surface has a fixed axial position relative to the flexible tubular pipe; and
- a collet connector assembly for releasably coupling the end connection assembly to the inboard hub, the collet connector assembly comprising a plurality of collet fingers;
- wherein the engagement surface is arranged on the end fitting radially outside of and circumferentially enclosing the at least one flexible layer;
- wherein the end fitting comprises a first section which is connected to an outer layer of said plurality of superposed flexible layers and a second section which is connected to an inner layer of said plurality of superposed flexible layers;
- wherein the first section surrounds at least a portion of the second section and is connected to the second section in a sealed manner to thereby define a sealed annular volume between the first and second sections within which an end of at least one intermediate layer of said plurality of superposed flexible layers is enclosed;
- wherein the engagement surface is formed on the first section and circumferentially encloses the at least one intermediate layer of said plurality of superposed flexible layers;
- wherein the second section includes a cylindrical portion which extends distally of the first section; and
- wherein said cylindrical portion includes an annular recess in which the collet fingers of the collet connector assembly are mounted.

2. The end connection assembly according to claim 1, wherein the engagement surface is circular-cylindrical.

3. The end connection assembly according to claim 1, wherein the end fitting forms an internal body of the collet connector assembly.

4. The end connection assembly according to claim 1, wherein said engagement surface is arranged radially outside of and circumferentially encloses the inner layer.

5. The end connection assembly according to claim 1, wherein the at least one intermediate layer comprises armour formed by a pair of crossed armour plies wound in opposite directions.

6. A method of producing an end connection assembly for pull-in and coupling of a flexible tubular pipe to an inboard hub of a subsea structure using a tie-in tool, the flexible tubular pipe comprising a plurality of superposed flexible layers, the method comprising:
- connecting an end fitting to an end section of the flexible tubular pipe in a sealed manner to form a termination of the flexible tubular pipe in which at least one flexible layer of said plurality of flexible layers is anchored;
- at a location radially outside of the at least one flexible layer, providing the end fitting with an engagement surface on the end fitting for interacting with pull-in engagement means of the tie-in tool, wherein the engagement surface has a fixed axial position relative to the flexible tubular pipe, and wherein the engagement surface circumferentially encloses said at least one flexible layer of the flexible tubular pipe; and
- mounting on the end fitting a collet connector assembly for releasably coupling the end connection assembly to the inboard hub, the collet connector assembly comprising a plurality of collet fingers;
- wherein the step of connecting the end fitting to the end section of the flexible tubular pipe comprises the steps of:
  - connecting a first section of said end fitting to an outer layer of said plurality of superposed flexible layers in a sealed manner;
  - connecting a second section of said end fitting to an inner layer of said plurality of superposed flexible layers in a sealed manner; and
  - connecting the first section to the second section in a sealed manner to thereby define a sealed annular volume between the first and second sections within which an end of at least one intermediate layer of said plurality of superposed flexible layers is enclosed;
- wherein the step of providing the end fitting with the engagement surface comprises providing the first section with the engagement surface such that the engagement surface circumferentially encloses said at least one intermediate layer of said plurality of superposed flexible layers; and
- wherein the step of mounting the collet connector assembly on the end fitting comprises mounting the collet fingers of the collet connector assembly in an annular recess which is formed on a cylindrical portion of the second section that extends distally of the first section.

7. The method according to claim 6, wherein the second section of the end fitting is produced from a first sub-section and a second sub-section, and wherein the method comprises the steps of:
- connecting the first sub-section to the inner layer;
- forming a first sub-assembly by connecting the first section to the first sub-section in a sealed manner, thereby enclosing the at least one intermediate layer in an annular volume between the first section and the first sub-section;
- testing the integrity of a first seal between the first section and the first sub-section;
- forming a second sub-assembly by mounting the collet connector assembly on the second sub-section;
- testing the integrity of a second seal between the collet connector assembly and the second sub-section; and
- after said steps of testing the integrity of the first and second seals, attaching the second sub-assembly to the first sub-assembly by attaching the second sub-section to the first sub-section.

8. The method according to claim 7, wherein the step of attaching the second sub-assembly to the first sub-assembly comprises joining the second sub-section and the first sub-section by welding.

* * * * *